(12) United States Patent
Takahashi (10) Patent No.: US 11,437,835 B2
(45) Date of Patent: Sep. 6, 2022

(54) BATTERY PACK AND POWER SUPPLY SYSTEM

(71) Applicant: DENSO CORPORATION, Kariya (JP)

(72) Inventor: Shin Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 156 days.

(21) Appl. No.: 16/419,129

(22) Filed: May 22, 2019

(65) Prior Publication Data

US 2019/0273228 A1 Sep. 5, 2019

Related U.S. Application Data

(63) Continuation of application No. PCT/JP2017/038659, filed on Oct. 26, 2017.

(30) Foreign Application Priority Data

Dec. 14, 2016 (JP) .............................. JP2016-242323

(51) Int. Cl.
*H02J 7/00* (2006.01)
*H02J 7/14* (2006.01)
(Continued)

(52) U.S. Cl.
CPC .......... *H02J 7/0068* (2013.01); *B60R 16/033* (2013.01); *H01M 10/425* (2013.01);
(Continued)

(58) Field of Classification Search
CPC ......... H02J 7/0068; H02J 7/14; B60R 16/033; H01M 50/543
See application file for complete search history.

(56) References Cited

U.S. PATENT DOCUMENTS

2016/0257270 A1* 9/2016 Teramoto .............. H01M 10/48
2018/0015981 A1 1/2018 Elwell et al.

FOREIGN PATENT DOCUMENTS

JP 2014-13722 A 1/2014
JP 2014022012 A * 2/2014
(Continued)

OTHER PUBLICATIONS

Terminal, dictionary.com, The American Heritage® Science Dictionary Copyright © 2011. Published by Houghton Mifflin Harcourt Publishing Company. Accessed Jan. 15, 2022 https://www.dictionary.com/browse/terminal (Year: 2011).*

*Primary Examiner* — Cynthia H Kelly
*Assistant Examiner* — Jenna Shulman
(74) *Attorney, Agent, or Firm* — Oliff PLC (57) ABSTRACT

A battery pack includes a power supply conduction member to be electrically connected to a power supply, a power supply terminal connected to the power supply conduction member, a load conduction member to be connected to an electrical load, a load terminal connected to the load conduction member, a wiring pattern connecting the power supply terminal and the load terminal, and a switch provided in the wiring pattern. The power supply conduction member includes a plurality of power supply connection terminals that are mechanically and electrically connected to a plurality of power supply terminals, respectively, and the load conduction member includes a plurality of load connection terminals that are mechanically and electrically connected to a plurality of load terminals, respectively.

10 Claims, 6 Drawing Sheets

(51) Int. Cl.
*B60R 16/033* (2006.01)
*H01M 50/50* (2021.01)
*H01M 10/42* (2006.01)
*H01M 50/543* (2021.01)

(52) U.S. Cl.
CPC ........... *H01M 50/50* (2021.01); *H02J 7/0014* (2013.01); *H02J 7/0024* (2013.01); *H02J 7/0047* (2013.01); *H02J 7/0063* (2013.01); *H02J 7/00304* (2020.01); *H02J 7/007182* (2020.01); *H02J 7/14* (2013.01); *H01M 50/543* (2021.01); *H02J 7/0013* (2013.01); *H02J 7/0042* (2013.01)

(56) References Cited

FOREIGN PATENT DOCUMENTS

| | | | |
|---|---|---|---|
| JP | 2014083374 A | * | 5/2014 |
| JP | 5541134 B2 | | 7/2014 |
| JP | 2015-109741 A | | 6/2015 |

\* cited by examiner

FIG. 8

BATTERY PACK AND POWER SUPPLY SYSTEM

CROSS REFERENCE TO RELATED APPLICATIONS

The present application is a continuation application of International Patent Application No. PCT/JP2017/038659 filed on Oct. 26, 2017, which designated the U.S. and claims the benefit of priority from Japanese Patent Application No. 2016-242323 filed on Dec. 14, 2016. The entire disclosures of all of the above applications are incorporated herein by reference.

TECHNICAL FIELD

The present disclosure relates to a battery pack, and a power supply system.

BACKGROUND

There is a power supply device in which a lead storage battery is electrically connected to an electrical load through a battery pack. The battery pack has a MOS-FET and a bypass relay connected in parallel. Therefore, even when a failure occurs, for example, in the MOS-FET, it is possible to electrically connect the lead storage battery to the electrical load through the bypass relay.

SUMMARY

The present disclosure describes a power supply device which is to be electrically connected to an electrical load and a power supply system. The power supply device includes a power supply conduction member to be electrically connected to the power supply, a power supply terminal mechanically and electrically connected to the power supply conduction member, a load conduction member to be electrically connected to the electrical load, a load terminal mechanically and electrically connected to the load conduction member, a wiring pattern connecting the power supply terminal and the load terminal, and a switch provided in the wiring pattern.

BRIEF DESCRIPTION OF DRAWINGS

The above and other objects, features and advantages of the present disclosure will become more apparent from the following detailed description made with reference to the accompanying drawings.

DETAILED DESCRIPTION

In recent years, larger current in a battery pack has been proceeding. With this, improvement in electrical connection reliability at connection points of a plurality of conductive members has been also required.

For example, in a power supply device in which a lead storage battery is electrically connected to an electrical load through a battery pack, the battery pack may have a MOS-FET and a bypass relay connected in parallel. In such a configuration, if a failure occurs, for example, in the MOS-FET, the lead storage battery may be connected to the electrical load through the bypass relay. However, both ends of the MOS-FET and both ends of the bypass relay may be respectively connected at the same connection points, that is, one of the two connection points may be connected to the lead storage battery, and the other may be connected to the electrical load. If a failure occurs in at least one of the two connection points, it may not be possible to electrically connect the power supply to the electrical load even though connection may be switched between the MOS-FET and the bypass relay.

According to an embodiment of the present disclosure, a battery pack includes a power supply conduction member that is to be electrically connected to a power supply, a power supply terminal that is mechanically and electrically connected to the power supply conduction member, a load conduction member that is to be electrically connected to an electrical load, a load terminal that is mechanically and electrically connected to the load conduction member, a wiring pattern that connects the power supply terminal and the load terminal, and a switch that is provided in the wiring pattern. The battery pack includes a plurality of power supply terminals, a plurality of load terminals, a plurality of wiring patterns, and a plurality of switches. The power supply conduction member includes a plurality of power supply connection terminals that are mechanically and electrically connected to the plurality of power supply terminals, respectively, and the load conduction member includes a plurality of load connection terminals that are mechanically and electrically connected to the plurality of load terminals, respectively.

According to another embodiment of the present disclosure, a power supply system includes a power supply, a power supply conduction member that is electrically connected to the power supply, a power supply terminal that is mechanically and electrically connected to the power supply conduction member, an electrical load, a load conduction member that is electrically connected to the electrical load, a load terminal that is mechanically and electrically connected to the load conduction member, a wiring pattern that connects the power supply terminal and the load terminal, and a switch that is provided in the wiring pattern. The power supply system includes a plurality of power supply terminals, a plurality of load terminals, a plurality of wiring patterns, and a plurality of switches. The power supply conduction member includes a plurality of power supply connection terminals that are mechanically and electrically connected to the plurality of power supply terminals, respectively, and the load conduction member includes a plurality of load connection terminals that are mechanically and electrically connected to the plurality of load terminals, respectively.

Accordingly, unlike a configuration having a single power supply connection terminal, a single power supply terminal, a single load terminal, and a single load connection terminal, the following operational effects are obtained. That is, even when a failure occurs in one of a plurality of connection parts between the power supply connection terminals and the power supply terminals, it is possible to electrically connect the power supply to the electrical load. Similarly, even when a failure occurs in one of a plurality of connection parts between the load terminals and the load connection terminals, it is possible to electrically connect the power supply to the electrical load. Deterioration in electrical connection reliability between the power supply and the electrical load is thereby suppressed.

Hereinafter, embodiments of the present disclosure will be described with reference to the accompanying drawings.

First Embodiment

A power supply system 200 according to the present embodiment will be described with reference to FIGS. 1 to 7.

The power supply system 200 is mounted on a vehicle. The vehicle having the power supply system 200 mounted thereon has an idle stop function of stopping an engine 130 when a predetermined stop condition is satisfied and restarting the engine 130 when a predetermined start condition is satisfied.

Figure 1:
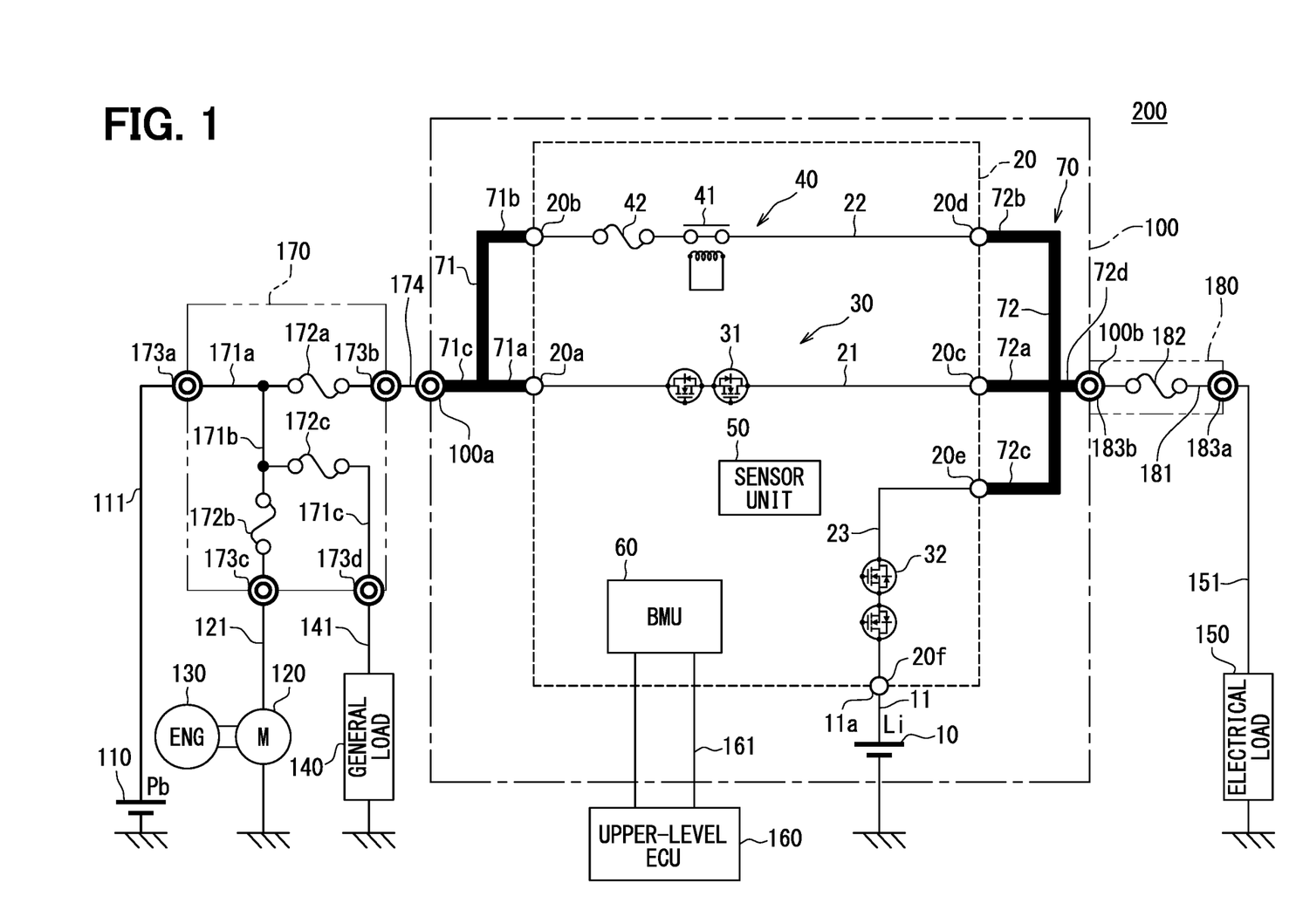
FIG. 1 is a block diagram showing the schematic configuration of a battery pack and a power supply system.

As shown in FIG. 1, the power supply system 200 has a battery pack 100, a lead storage battery 110, a rotary electric machine 120, the engine 130, a general load 140, an electrical load 150, an upper-level ECU 160, a power supply fuse box 170, and a load fuse box 180.

The lead storage battery 110, the rotary electric machine 120, the general load 140, and the battery pack 100 are electrically connected to each other through the power supply fuse box 170. The electrical load 150 is electrically connected to the battery pack 100 through the load fuse box 180. The lead storage battery 110, the rotary electric machine 120, and the general load 140 are thereby each electrically connected to the electrical load 150 through the power supply fuse box 170, the battery pack 100, and the load fuse box 180. The upper-level ECU 160 is electrically connected to each of the lead storage battery 110 and the battery pack 100 through a wiring line (not shown). With the above electrical connection configuration, it is possible to feed power from at least one of the lead storage battery 110 and the battery pack 100 to each of the rotary electric machine 120, the general load 140, the electrical load 150, and the upper-level ECU 160.

Hereinafter, each constituent element of the power supply system 200 will be described individually. However, the battery pack 100 will be described in detail later.

The lead storage battery 110 generates an electromotive voltage by a chemical reaction. The lead storage battery 110 is electrically connected to the power supply fuse box 170 through a power supply wire 111. The lead storage battery 110 corresponds to a power supply.

The rotary electric machine 120 performs powering and electricity generation. The rotary electric machine 120 is connected to an inverter (not shown). The inverter is electrically connected to the power supply fuse box 170 through an electric machine wire 121. The rotary electric machine 120 is thereby electrically connected to each of the battery pack 100 and the lead storage battery 110.

The inverter converts a DC voltage supplied from at least one of the lead storage battery 110 and the battery pack 100 into an AC voltage. The AC voltage is supplied to the rotary electric machine 120. The rotary electric machine 120 thereby performs powering.

The rotary electric machine 120 is coupled to the engine 130. The rotary electric machine 120 and the engine 130 can transmit rotational energy to each other through a belt or the like. The rotational energy generated by the powering of the rotary electric machine 120 is transmitted to the engine 130. The rotation of the engine 130 is thereby facilitated. As a result, vehicle travel is assisted. As described above, the vehicle having the power supply system 200 mounted thereon has the idle stop function. The rotary electric machine 120 serves not only the function of assisting the vehicle travel but also the function of rotating a crankshaft at the time of the restart of the engine 130.

The rotary electric machine 120 also has the function of generating electricity by at least one of the rotational energy of the engine 130 and the rotational energy of a wheel of the vehicle. The rotary electric machine 120 generates an AC voltage by electricity generation. The AC voltage is converted into a DC voltage by the inverter. The DC voltage is supplied to the lead storage battery 110 and the battery pack 100.

The engine 130 generates a driving force of the vehicle by fuel combustion drive. A starter (not shown) is mounted on the vehicle. The starter is electrically connected to the lead storage battery 110. When the engine 130 is started, the crankshaft is rotated by the starter. However, when the engine 130 is restarted after once stopped by the idle stop, the crankshaft is rotated by the rotary electric machine 120.

The general load 140 is an electrical load such as a headlight, a wiper, and a blower fan. The general load 140 has the property of not requiring constant supply power. The general load 140 is electrically connected to the power supply fuse box 170 through a first load wire 141. The general load 140 is thereby electrically connected to each of the battery pack 100, the lead storage battery 110, and the rotary electric machine 120.

The electrical load 150 is required to be supplied with constant power. More specifically, the electrical load 150 is a navigation system, an audio system, EPS, ABS, etc. The electrical load 150 has the property of being switched from an on state to an off state when a supply voltage falls below a threshold voltage. The electrical load 150 is mechanically and electrically connected to the load fuse box 180 through a second load wire 151. The electrical load 150 is thereby electrically connected to the battery pack 100.

The upper-level ECU 160 mutually transmits and receives signals to/from various ECUs such as other battery ECUs mounted on the vehicle and a BMU 60 of the battery pack 100 described later through a bus wiring line 161 to cooperatively control the vehicle. The amount of depression of an accelerator pedal and a throttle valve opening detected by sensors (not shown), the output voltage or current of the lead storage battery 110 indicating the state of charge of the lead storage battery 110, and the like are inputted to the upper-level ECU 160. Further, information about the battery pack 100 is also inputted to the upper-level ECU 160. The upper-level ECU 160 outputs a command signal to the BMU 60, based on these pieces of information. The BMU 60 controls a switch 30 and a bypass circuit 40 of the battery pack 100 described later, based on the command signal.

The power supply fuse box 170 has bus bars, fuses, connection terminals, and a resin case. Each bus bar is housed in the resin case. The bus bar is provided with a fuse. Further, a connection terminal is provided at an end of the bus bar. The connection terminal is mechanically and electrically connected to a wire.

The power supply fuse box 170 has a first bus bar 171a, a second bus bar 171b, and a third bus bar 171c as the bus bars. The power supply fuse box 170 has a first fuse 172a, a second fuse 172b, and a third fuse 172c as the fuses. The power supply fuse box 170 has a first connection terminal 173a, a second connection terminal 173b, a third connection terminal 173c, and a fourth connection terminal 173d as the connection terminals.

The first bus bar 171a is provided with the first fuse 172a. The first connection terminal 173a is provided at one end of the first bus bar 171a. The second connection terminal 173b is provided at the other end of the first bus bar 171a. An end of the power supply wire 111 is screwed (bolted) to the first connection terminal 173a. One end of a coupling wire 174 is screwed to the second connection terminal 173b. The other end of the coupling wire 174 is screwed to a power supply external terminal 100a of the battery pack 100. With the above connection configuration, the lead storage battery 110 is electrically connected to the battery pack 100. The coupling wire 174 corresponds to a power supply wiring line.

The second bus bar 171b is provided with the second fuse 172b. The third connection terminal 173c is provided at one end of the second bus bar 171b. The other end of the second bus bar 171b is coupled to the first bus bar 171a. More specifically, the other end of the second bus bar 171b is coupled between the first connection terminal 173a and the first fuse 172a of the first bus bar 171a. Further, an end of the electric machine wire 121 is screwed to the third connection terminal 173c. With the above connection configuration, the rotary electric machine 120 is electrically connected to each of the lead storage battery 110 and the battery pack 100.

The third bus bar 171c is provided with the third fuse 172c. The fourth connection terminal 173d is provided at one end of the third bus bar 171c. The other end of the third bus bar 171c is coupled to the second bus bar 171b. More specifically, the other end of the third bus bar 171c is coupled between the coupling part with the first bus bar 171a and the second fuse 172b of the second bus bar 171b. The fourth connection terminal 173d is a connector. An end of the first load wire 141 is fitted to the fourth connection terminal 173d. With the above connection configuration, the general load 140 is electrically connected to each of the lead storage battery 110, the battery pack 100, and the rotary electric machine 120.

With the above connection configuration of the power supply fuse box 170, when the first fuse 172a is melted by heat generated by the passage of a large current, the electrical connection of each of the lead storage battery 110, the rotary electric machine 120, and the general load 140 to the battery pack 100 is cut off. When the second fuse 172b is melted by heat generated by the passage of a large current, the electrical connection of the rotary electric machine 120 to each of the lead storage battery 110, the general load 140, and the battery pack 100 is cut off. When the third fuse 172c is melted by heat generated by the passage of a large current, the electrical connection of the general load 140 to each of the lead storage battery 110, the rotary electric machine 120, and the battery pack 100 is cut off.

The load fuse box 180 has a fourth bus bar 181, a fourth fuse 182, a fifth connection terminal 183a, a sixth connection terminal 183b, and a resin case (not shown). The fourth bus bar 181 is housed in the resin case. The fourth bus bar 181 is provided with the fourth fuse 182. Further, the fifth connection terminal 183a is provided at one end of the fourth bus bar 181. The sixth connection terminal 183b is provided at the other end of the fourth bus bar 181. The fourth bus bar 181 corresponds to a load wiring line.

The fifth connection terminal 183a is a connector. An end of the second load wire 151 is fitted to the fifth connection terminal 183a. Further, the sixth connection terminal 183b is screwed to a load external terminal 100b of the battery pack 100. With the above connection configuration, the electrical load 150 is electrically connected to the battery pack 100.

With the above connection configuration of the load fuse box 180, when the fourth fuse 182 is melted by heat generated by the passage of a large current, the electrical connection of the electrical load 150 to the battery pack 100 is cut off.

Next, the battery pack 100 will be described. As shown in FIG. 1, the battery pack 100 has a lithium storage battery 10, a board 20, the switch 30, the bypass circuit 40, a sensor unit 50, the BMU 60, and a bus bar 70. The switch 30, the bypass circuit 40, and the BMU 60 are mounted on the board 20, so that an electrical circuit is configured. The lithium storage battery 10 and the sensor unit 50 are electrically connected to the electrical circuit. The electrical circuit is electrically connected to each of the power supply external terminal 100a and the load external terminal 100b through the bus bar 70. Therefore, the electrical circuit is electrically connected to the lead storage battery 110, the rotary electric machine 120, the general load 140, and the electrical load 150. Further, at least a part of the sensor unit 50 may configure a part of the electrical circuit.

The battery pack 100 has an enclosure (not shown). The enclosure is formed by aluminum die casting. The lithium storage battery 10, the board 20, the switch 30, the bypass circuit 40, the sensor unit 50, the BMU 60, and the bus bar 70 are housed in the enclosure. The enclosure also serves the function of dissipating heat generated at the lithium storage battery 10 and the board 20. The enclosure is provided under a seat of the vehicle.

As described above, the example in which the switch 30 is mounted on the board 20 is shown. However, the switch 30 is not required to be directly mounted on the board 20, and may only be required to be electrically connected to the board 20. In this modification, for example, the switch 30 is mounted on the enclosure. The switch 30 is thereby thermally connected to the enclosure. Heat generated at the switch 30 is positively conducted to the enclosure instead of the board 20. The heat dissipation of the switch 30 is thereby facilitated.

The lithium storage battery 10 generates an electromotive voltage by a chemical reaction. The lithium storage battery 10 has a plurality of battery cells connected in series. The lithium storage battery 10 is connected to the board 20 through an internal terminal 11.

The lithium storage battery 10 and the board 20 are arranged in a horizontal direction. Alternatively, the lithium storage battery 10 and the board 20 are arranged in a top-bottom direction. In this context, the horizontal direction and the top-bottom direction are directions for explaining the arrangement of the lithium storage battery 10 and the board 20 in the case where the vehicle having the power supply system 200 mounted thereon is positioned on a horizontal plane. The horizontal direction and the top-bottom direction are orthogonal to each other, and the top-bottom direction is a vertical direction.

The board 20 is a printed circuit board where a wiring pattern made of a conductive material is formed on an insulating board. A first feeder line 21, a second feeder line 22, and a third feeder line 23 are formed as wiring patterns on at least one of the surface and inside of the board 20. The first feeder line 21 corresponds to a first wiring pattern. The second feeder line 22 corresponds to a second wiring pattern.

Terminals that are mechanically and electrically connected to the bus bar 70 are formed on the board 20. The terminals include a first power supply terminal 20a, a second power supply terminal 20b, a first load terminal 20c, a second load terminal 20d, a third load terminal 20e, and a third power supply terminal 20f.

The first feeder line 21 electrically connects the first power supply terminal 20a to the first load terminal 20c. The second feeder line 22 electrically connects the second power supply terminal 20b to the second load terminal 20d. The third feeder line 23 electrically connects the third load terminal 20e to the third power supply terminal 20f.

As described later, the first power supply terminal 20a and the second power supply terminal 20b are mechanically and electrically connected to the power supply external terminal 100a through a power supply bus bar 71. Further, the first load terminal 20c, the second load terminal 20d, and the third load terminal 20e are each mechanically and electrically connected to the load external terminal 100b through a load bus bar 72.

Further, the internal terminal 11 is mechanically and electrically connected to the third power supply terminal 20f. More specifically, a connection end 11a of the internal terminal 11 is soldered by solder to the third power supply terminal 20f.

The switch 30 is a semiconductor switch. More specifically, the switch 30 is a MOSFET. When a control signal is inputted to a gate electrode, the switch 30 is brought into a closed state. On the other hand, when the control signal is not inputted, the switch 30 is brought into an opened state.

The MOSFET according to the present embodiment is an N-channel type MOSFET. Therefore, the control signal is a high-level signal. When the control signal is inputted, a gate voltage becomes high, so that the MOSFET is brought into the closed state. When the control signal is not inputted, the gate voltage becomes low, so that the MOSFET is brought into the opened state. The gate voltage is a potential difference between the gate electrode and a source electrode.

The switch 30 has a first switch 31 and a second switch 32. The switches each have at least one opening/closing unit composed of two MOSFETs connected in series. The source electrodes of the two MOSFETs are coupled to each other. The gate electrodes of the two MOSFETs are electronically independent from each other. The MOSFET has a parasitic diode. The anode electrodes of the parasitic diodes of the two MOSFETs are coupled to each other.

The first switch 31 has a plurality of opening/closing units though FIG. 1 shows one opening/closing unit. The opening/closing units are connected in parallel. Further, the respective source electrodes of the opening/closing units are electrically connected to each other. The first switch 31 is provided in the first feeder line 21. Thereby, by controlling the opening/closing of the first switch 31, the electrical connection between the first power supply terminal 20a and the first load terminal 20c is controlled. Further, by controlling the opening/closing of the first switch 31, the electrical connection between the power supply external terminal 100a and the load external terminal 100b is controlled.

Similarly, the second switch 32 has a plurality of opening/closing units though FIG. 1 shows one opening/closing unit. The opening/closing units are connected in parallel, and the respective source electrodes are electrically connected to each other. The second switch 32 is provided in the third feeder line 23. Thereby, by controlling the opening/closing of the second switch 32, the electrical connection between the third power supply terminal 20f and the third load terminal 20e is controlled. Further, by controlling the opening/closing of the second switch 32, the electrical connection between the lithium storage battery 10 and the load external terminal 100b is controlled. Furthermore, by controlling the opening/closing of the second switch 32, the electrical connection between the lithium storage battery 10 and each of the first load terminal 20c and the second load terminal 20d is controlled.

The bypass circuit 40 has a bypass relay 41 and a bypass fuse 42. The bypass relay 41 is a mechanical relay. More specifically, the bypass relay 41 is a normally-closed-type electromagnetic relay. Therefore, when an excitation current is inputted as a control signal, the bypass relay 41 is brought into a closed state. On the other hand, when the excitation current is not inputted, the bypass relay 41 is brought into an opened state.

The bypass relay 41 and the bypass fuse 42 are provided in the second feeder line 22. Further, the bypass relay 41 and the bypass fuse 42 are connected in series. Thereby, by controlling the opening/closing of the bypass relay 41, the electrical connection between a second power supply connection terminal 71b and the second load terminal 20d is controlled. Further, by controlling the opening/closing of the bypass relay 41, the electrical connection between the power supply external terminal 100a and the load external terminal 100b is controlled. Thus, the bypass relay 41 is connected in parallel to the first switch 31. A first current conduction path where the first switch 31 is provided is higher in withstand current (ability to withstand current-conduction) than a second current conduction path where the bypass relay 41 is provided.

The sensor unit 50 detects the respective states of the lithium storage battery 10, the switch 30, and the bypass relay 41. The sensor unit 50 has a temperature sensor, a current sensor, and a voltage sensor. The sensor unit 50 detects the temperature, current, and voltage of the lithium storage battery 10. The sensor unit 50 outputs them to the BMU 60 as the state signals of the lithium storage battery 10. Further, the sensor unit 50 detects the temperature, current, and voltage of the switch 30. The sensor unit 50 outputs them to the BMU 60 as the state signals of the switch 30. Further, the sensor unit 50 detects the temperature, current, and voltage of the bypass relay 41. The sensor unit 50 outputs them to the BMU 60 as the state signals of the bypass relay 41.

As described above, the switch 30 has the opening/closing unit in which the source electrodes of the two MOSFETs are connected to each other. The sensor unit 50 detects the temperature and current of the source electrode. Further, the sensor unit 50 detects the voltage across each of the two MOSFETs. The sensor unit 50 is not required to detect the voltages of the source electrodes of the two MOSFETs. In other words, the sensor unit 50 may only detect the voltages of the respective drain electrodes of the two MOSFETs.

The sensor unit 50 detects the current of the second feeder line 22, and thereby detects the current flowing through the bypass relay 41. Further, the sensor unit 50 detects the voltage across the bypass relay 41.

The BMU 60 controls the switch 30 and the bypass relay 41, based on at least one of the state signal of the sensor unit 50 and the command signal from the upper-level ECU 160. BMU stands for Battery Management Unit. The BMU 60 corresponds to an opening/closing control unit. Further, the sensor unit 50 and the BMU 60 correspond to a failure detection unit.

The BMU 60 determines the state of charge of the lithium storage battery 10 and the abnormality of the switch 30 and the bypass relay 41, based on the state signal of the sensor unit 50. The BMU 60 outputs a signal (determination information) obtained by determining these abnormalities to the upper-level ECU 160.

Based on the command signal from the upper-level ECU 160, the BMU 60 controls the switch 30 and the bypass relay 41 as follows. That is, the BMU 60 performs opening/closing control of the first switch 31 and the second switch 32, based on the driving state of the rotary electric machine 120 and the SOC of each of the lead storage battery 110 and the lithium storage battery 10. More specifically, the BMU 60 performs opening/closing control of the first switch 31 and the second switch 32 so that a supply voltage to the electrical load 150 does not fall below a threshold voltage and so that each of the lead storage battery 110 and the lithium storage battery 10 is not overcharged or overdischarged. Further, when the engine 130 is in a driving state, the BMU 60 controls the bypass relay 41 into the opened state. Further, when the engine 130 is stopped and the vehicle is parked or stopped, the BMU 60 controls the bypass relay 41 into the closed state.

The BMU 60 controls one of the first switch 31 and the bypass relay 41 into the opened state and the other into the closed state. Further, as described later, the BMU 60 performs fail-safe processing at the time of failure determination.

The bus bar 70 is made of a conductive material such as copper. The bus bar 70 has a structure in which a plurality of flat plates are integrally coupled. The main surfaces of the flat plates are opposed in parallel to each other. In the flat plates, a plurality of connection terminals extend from a side surface orthogonal to the main surfaces. The leading ends of the connection terminals are connected to the board 20. Further, the ends of the bus bar 70 are connected to the power supply external terminal 100a and the load external terminal 100b, respectively.

As a matter of course, the bus bar 70 is not limited to the above structure. For example, it is also possible to adopt a configuration in which the end of the bus bar 70 is divided into a plurality of ends, and the divided ends are connected to the board 20. Further, it is also possible to adopt a configuration in which an intermediate part of the bus bar 70 is connected to the power supply external terminal 100a or the load external terminal 100b.

The bus bar 70 may be produced by bending one flat plate. The bus bar 70 may be produced by welding a plurality of flat plates. Moreover, the bus bar 70 may be produced by pouring a molten conductive material into a mold. The production method of the bus bar 70 is not particularly limited. As a matter of course, the bus bar 70 is higher in withstand current than the wiring pattern formed on the board 20.

The bus bar 70 has the power supply bus bar 71 and the load bus bar 72. The power supply bus bar 71 mechanically and electrically connects the power supply external terminal 100a to the board 20. The load bus bar 72 mechanically and electrically connects the load external terminal 100b to the board 20. The power supply bus bar 71 corresponds to a power supply conduction member. The load bus bar 72 corresponds to a load conduction member.

The power supply bus bar 71 has three connection terminals. The three connection terminals are at the same potential. Two of the three connection terminals of the power supply bus bar 71 are connected to the board 20. The remaining connection terminal is connected to the power supply external terminal 100a. The power supply bus bar 71 has a first power supply connection terminal 71a, a second power supply connection terminal 71b, and a third power supply connection terminal 71c as the above connection terminals. The first power supply connection terminal 71a and the second power supply connection terminal 71b are each soldered to the board 20. More specifically, the first power supply connection terminal 71a is mechanically and electrically connected by solder to the first power supply terminal 20a. The second power supply connection terminal 71b is mechanically and electrically connected by solder to the second power supply terminal 20b. Further, the third power supply connection terminal 71c is mechanically and electrically connected by screwing to the power supply external terminal 100a, along with the other end of the coupling wire 174.

Further, the third power supply connection terminal 71c may configure at least a part of the power supply external terminal 100a. Further, the third power supply connection terminal 71c and the coupling wire 174 may be mechanically and electrically connected by welding.

With the above connection, the mechanical strength between the power supply bus bar 71 and the coupling wire 174 is higher than the mechanical strength between the power supply bus bar 71 and the board 20. Further, the electrical circuit of the battery pack 100 is electrically connected to the power supply fuse box 170.

The load bus bar 72 has four connection terminals. The four connection terminals are at the same potential. Three connection terminals of the load bus bar 72 are connected to the board 20. The remaining connection terminal is connected to the load external terminal 100b.

The load bus bar 72 has a first load connection terminal 72a, a second load connection terminal 72b, a third load connection terminal 72c, and a fourth load connection terminal 72d as the above connection terminals. The first load connection terminal 72a, the second load connection terminal 72b, and the third load connection terminal 72c are each soldered to the board 20. More specifically, the first load connection terminal 72a is mechanically and electrically connected by solder to the first load terminal 20c. The second load connection terminal 72b is mechanically and electrically connected by solder to the second load terminal 20d. The third load connection terminal 72c is mechanically and electrically connected by solder to the third load terminal 20e. Further, the fourth load connection terminal 72d is screwed to the load external terminal 100b, along with the sixth connection terminal 183b of the load fuse box 180.

Further, the fourth load connection terminal 72d may configure at least a part of the load external terminal 100b. Further, the fourth load connection terminal 72d and the load fuse box 180 may be mechanically and electrically connected by welding.

With the above connection, the mechanical strength between the load bus bar 72 and the load fuse box 180 is higher than the mechanical strength between the load bus bar 72 and the board 20. Further, the electrical circuit of the battery pack 100 is electrically connected to the load fuse box 180.

Next, failure determination processing of the BMU 60 based on the voltage of the battery pack 100 will be described with reference to FIG. 2. The processing may be performed periodically or may be performed sporadically.

First, in step S10, the BMU 60 determines whether or not the first switch 31 is in the closed state and the bypass relay 41 is in the opened state. That is, the BMU 60 determines whether or not the BMU 60 outputs the control signal to each of the first switch 31 and the bypass relay 41. When the control signal is outputted to the first switch 31 and the bypass relay 41, the BMU 60 proceeds to step S20. When different therefrom, the BMU 60 proceeds to step S30.

In step S20, the BMU 60 compares a first voltage V1 applied to the first switch 31 and a second voltage V2 applied to the bypass relay 41, based on the state signal of the sensor unit 50. The first current conduction path where the first switch 31 is provided and the second current conduction path where the bypass relay 41 is provided are electrically connected through the power supply bus bar 71 and the load bus bar 72. Therefore, when the first switch 31 is in the closed state and there is no failure therein, the first current conduction path and the second current conduction path are expected to be at the same potential, regardless of the driving state of the rotary electric machine 120. In other words, the first voltage V1 and the second voltage V2 are expected to be the same.

The first voltage V1 represents one voltage of the two ends of the first switch 31. Similarly, the second voltage V2 represents one voltage of the two ends of the bypass relay 41. More specifically, the first voltage V1 represents one of the potential difference between a potential between the first power supply terminal 20a and the first switch 31 and a ground potential and the potential difference between a potential between the first switch 31 and the first load terminal 20c and the ground potential. Further, the second voltage V2 represents one of the potential difference between a potential between the second power supply terminal 20b and the bypass relay 41 and the ground potential and the potential difference between a potential between the bypass relay 41 and the second load terminal 20d and the ground potential.

As a matter of course, the voltage across the first switch 31 represents the potential difference between the potential between the first power supply terminal 20a and the first switch 31 and the potential between the first switch 31 and the first load terminal 20c. The voltage across the bypass relay 41 represents the potential difference between the potential between the second power supply terminal 20b and the bypass relay 41 and the potential between the bypass relay 41 and the second load terminal 20d. The BMU 60 can detect the voltage across the first switch 31 and the voltage across the bypass relay 41 as needed.

Hereinafter, the connection part between the first power supply connection terminal 71a and the first power supply terminal 20a is referred to as a first power supply connection part, and the connection part between the first load connection terminal 72a and the first load terminal 20c is referred to as a first load connection part. For example, when the respective electrical connections of the first power supply connection part and the first load connection part are normal, the respective voltages of the two ends of the first switch 31 and the respective voltages of the two ends of the bypass relay 41 are equal to each other.

Figure 3:
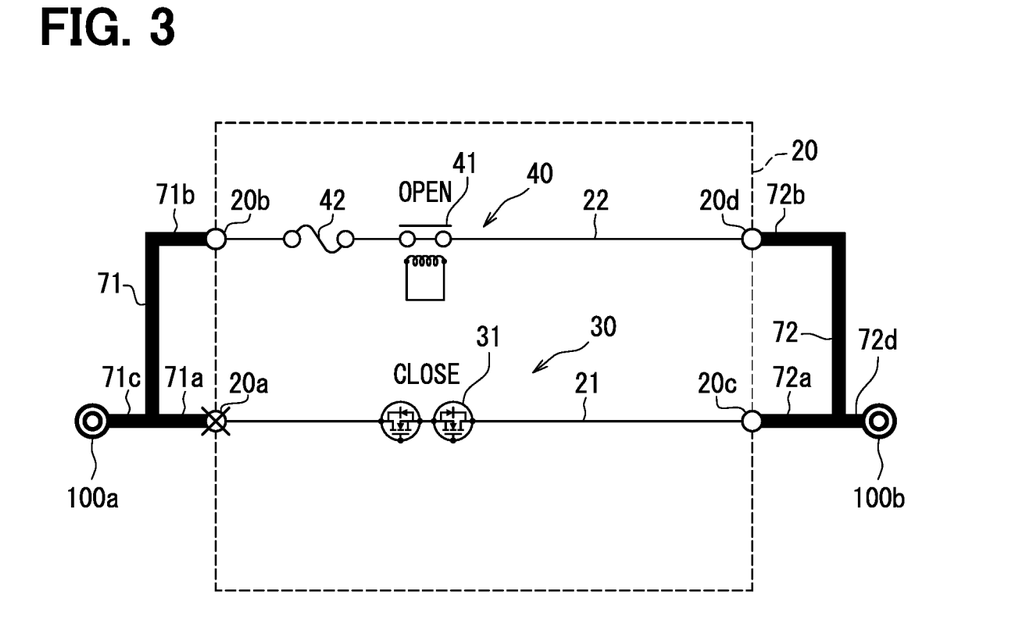
FIG. 3 is a schematic diagram showing a state in which a failure occurs at a first power supply terminal.

However, when the electrical connection of the first power supply connection part is abnormal as shown by an X mark in FIG. 3, the power supply external terminal 100a and the load external terminal 100b are brought into a non-conduction state. The second voltage V2 of the end of the bypass relay 41 adjacent to the second power supply terminal 20b is the same potential as that of the power supply external terminal 100a. Further, the first voltage V1 is the same potential as that of the load external terminal 100b. The first voltage V1 thereby differs from the second voltage V2.

Figure 4:
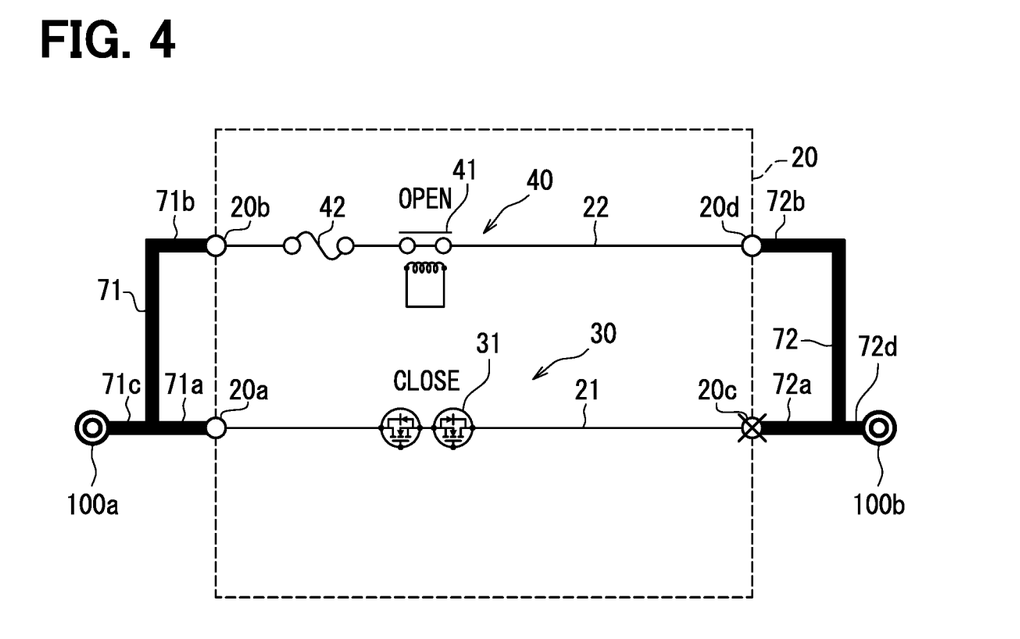
FIG. 4 is a schematic diagram showing a state in which a failure occurs at a first load terminal.

When the electrical connection of the first load connection part is abnormal as shown by an X mark in FIG. 4, in the same way, the power supply external terminal 100a and the load external terminal 100b are brought into the non-conduction state. The second voltage V2 of the end of the bypass relay 41 adjacent to the second load terminal 20d is the same potential as that of the load external terminal 100b. Further, the first voltage V1 is the same potential as that of the power supply external terminal 100a. The first voltage V1 thereby differs from the second voltage V2.

Thus, when the first voltage V1 and the second voltage V2 are the same, the BMU 60 determines that there is no failure in the first current conduction path, and ends the failure determination processing. The BMU 60 continues to control the first switch 31 to the closed state and the bypass relay 41 to the opened state in accordance with the command signal of the upper-level ECU 160.

Due to the influence of a wiring resistance, a measurement error, or the like, the first voltage V1 and the second voltage V2 are not exactly the same in a precise sense. However, in the case where the voltage difference between the first voltage V1 and the second voltage V2 falls within the extent of the wiring resistance and the measurement error, the BMU 60 determines that the first voltage V1 is equal to the second voltage V2.

When the first voltage V1 differs from the second voltage V2, the BMU 60 determines that there is a failure in the first current conduction path, and proceeds to step S40. Then, the BMU 60 performs the fail-safe processing without following the command signal of the upper-level ECU 160. More specifically, the BMU 60 stops the output of the control signal to the bypass relay 41 and continues to hold the bypass relay 41 in the closed state. Further, the BMU 60 stops the output of the control signal to the first switch 31 and continues to hold the first switch 31 in the opened state. Then, the BMU 60 ends the failure determination processing.

In step S10 of the flow, when it is not determined that the first switch 31 is in the closed state and the bypass relay 41 is in the opened state, the BMU 60 proceeds to step S30. In step 30, the BMU 60 determines whether the first switch 31 is in the opened state and the bypass relay 41 is in the closed state. That is, the BMU 60 determines whether the BMU 60 does not output the control signal to each of the first switch 31 and the bypass relay 41. When the control signal is not outputted to the first switch 31 and the bypass relay 41, the BMU 60 proceeds to step S50. When different therefrom, the BMU 60 ends the failure determination processing.

In step S50, the BMU 60 compares the second voltage V2 and the first voltage V1, based on the state signal of the sensor unit 50. When there is no failure in the second current conduction path where the bypass relay 41 in the closed state is provided, the second current conduction path and the first current conduction path are expected to be at the same potential, regardless of the driving state of the rotary electric machine 120. In other words, the second voltage V2 and the first voltage V1 are expected to be the same.

Hereinafter, the connection part between the second power supply connection terminal 71b and the second power supply terminal 20b is referred to as a second power supply connection part, and the connection part between the second load connection terminal 72b and the second load terminal 20d is referred to as a second load connection part. For example, when the respective electrical connections of the second power supply connection part and the second load connection part are normal, the respective voltages of the two ends of the first switch 31 and the respective voltages of the two ends of the bypass relay 41 are equal to each other.

Figure 5:
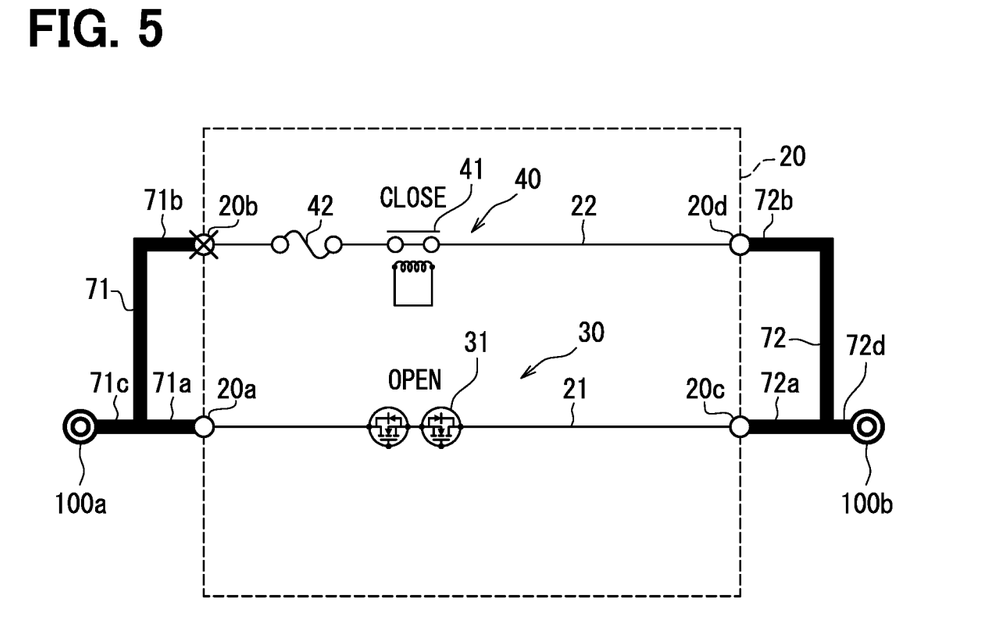
FIG. 5 is a schematic diagram showing a state in which a failure occurs at a second power supply terminal.

However, when the electrical connection of the second power supply connection part is abnormal as shown by an X mark in FIG. 5, the power supply external terminal 100*a* and the load external terminal 100*b* are brought into a non-conduction state. The first voltage V1 of the end of the first switch 31 adjacent to the first power supply terminal 20*a* is the same potential as that of the power supply external terminal 100*a*. Further, the second voltage V2 is the same potential as that of the load external terminal 100*b*. The second voltage V2 thereby differs from the first voltage V1.

Figure 6:
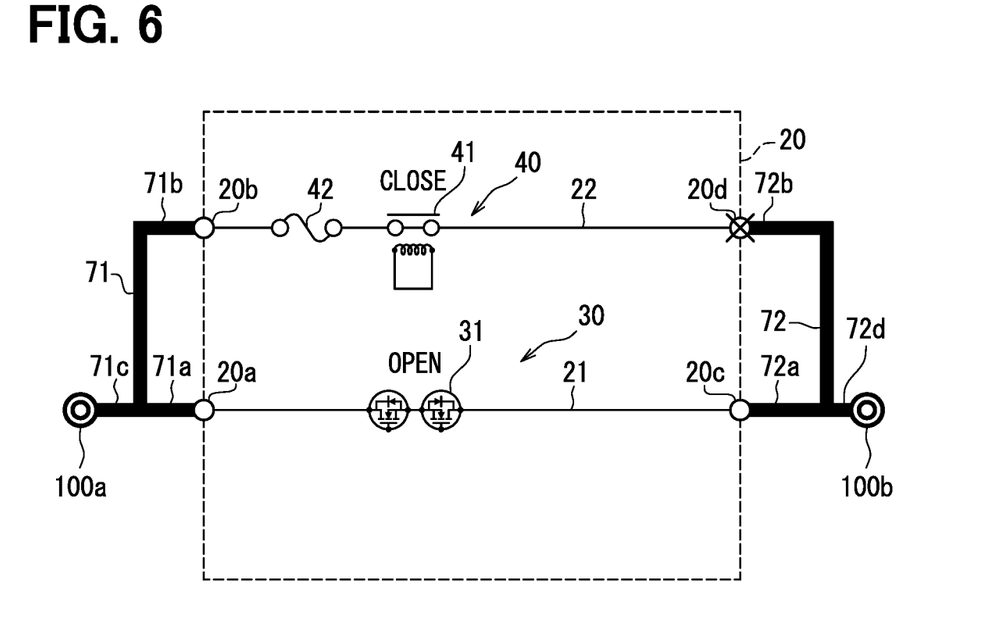
FIG. 6 is a schematic diagram showing a state in which a failure occurs at a second load terminal.

When the electrical connection of the second load connection part is abnormal as shown by an X mark in FIG. 6, in the same way, the power supply external terminal 100*a* and the load external terminal 100*b* are brought into the non-conduction state. The first voltage V1 of the end of the first switch 31 adjacent to the first load terminal 20*c* is the same potential as that of the load external terminal 100*b*. Further, the second voltage V2 is the same potential as that of the power supply external terminal 100*a*. The second voltage V2 thereby differs from the first voltage V1.

Thus, when the second voltage V2 and the first voltage V1 are the same, the BMU 60 determines that there is no failure in the second current conduction path, and ends the failure determination processing. The BMU 60 continues to control the bypass relay 41 to the closed state and the first switch 31 to the opened state in accordance with the command signal of the upper-level ECU 160.

Unlike this, when the second voltage V2 differs from the first voltage V1, the BMU 60 determines that there is a failure in the second current conduction path, and proceeds to step S60. Then, the BMU 60 performs the fail-safe processing without following the command signal of the upper-level ECU 160. More specifically, the BMU 60 outputs the control signal to the first switch 31 and continues to hold the first switch 31 in the closed state. Further, the control signal may or may not be outputted to the bypass relay 41. Then, the BMU 60 ends the failure determination processing.

Next, failure determination processing of the BMU 60 based on the current of the battery pack 100 will be described with reference to FIG. 7. The processing may be performed periodically or may be performed sporadically.

First, in step S110, the BMU 60 determines whether or not the first switch 31 is in the closed state. That is, the BMU 60 determines whether or not the BMU 60 outputs the control signal to the first switch 31. When the control signal is outputted to the first switch 31, the BMU 60 proceeds to step S120. When different therefrom, the BMU 60 proceeds to step S130.

In the case where the control signal is outputted to the first switch 31, generally the control signal is also outputted to the bypass relay 41. However, in step S110 of the failure determination based on the current, the opened/closed state of the bypass relay 41 is not considered. Therefore, in step S110, determination is not made on the opened/closed state of the bypass relay 41.

In step S120, the BMU 60 determines whether or not a first current I1 flowing through the first switch 31 is zero, based on the state signal of the sensor unit 50. When there is no failure in the first current conduction path where the first switch 31 in the closed state is provided, the first current I1 is expected not to be zero. On the other hand, when there is a failure in the first current conduction path, the first current I1 is zero.

Thus, when the first current I1 is not zero, the BMU 60 determines that there is no failure in the first current conduction path, and ends the failure determination processing. The BMU 60 continues to control the first switch 31 to the closed state in accordance with the command signal of the upper-level ECU 160.

When the first current I1 is zero, the BMU 60 determines that there is a failure in the first current conduction path, and proceeds to step S140. Then, the BMU 60 performs the fail-safe processing without following the command signal of the upper-level ECU 160. More specifically, the BMU 60 stops the output of the control signal to the bypass relay 41 and continues to hold the bypass relay 41 in the closed state. Further, the BMU 60 also stops the output of the control signal to the first switch 31. Then, the BMU 60 ends the failure determination processing.

Due to the influence of a measurement error or the like, the first current I1 is not zero in a precise sense. However, in the case where the deviation of the first current I1 from zero falls within the extent of the measurement error, the BMU 60 determines that the first current I1 is zero.

In step S110, when the BMU 60 determines that the first switch 31 is in the opened state, the BMU 60 proceeds to step S130. In step S130, the BMU 60 determines whether the bypass relay 41 is in the closed state. That is, the BMU 60 determines whether the BMU 60 does not output the control signal to the bypass relay 41. When the control signal is not outputted to the bypass relay 41, the BMU 60 proceeds to step S150. When different therefrom, the BMU 60 ends the failure determination processing.

In the case where the control signal is not outputted to the bypass relay 41, generally the control signal is also not outputted to the first switch 31. However, in step S130 of the failure determination based on the current, the opened/closed state of the first switch 31 is not considered. Therefore, in step S130, determination is not made on the opened/closed state of the first switch 31.

In step S150, the BMU 60 determines whether or not a second current I2 flowing through the bypass relay 41 is zero, based on the state signal of the sensor unit 50. When there is no failure in the second current conduction path where the bypass relay 41 in the closed state is provided, the second current I2 is expected not to be zero. On the other hand, when there is a failure in the second current conduction path, the second current I2 is zero.

Thus, when the second current I2 is not zero, the BMU 60 determines that there is no failure in the second current conduction path, and ends the failure determination processing. The BMU 60 continues to control the bypass relay 41 to the closed state in accordance with the command signal of the upper-level ECU 160.

When the second current I2 is zero, the BMU 60 determines that there is a failure in the second current conduction path, and proceeds to step S160. Then, the BMU 60 performs the fail-safe processing without following the command signal of the upper-level ECU 160. More specifically, the BMU 60 outputs the control signal to the first switch 31 and continues to hold the first switch 31 in the closed state. Further, the control signal may or may not be outputted to the bypass relay 41. Then, the BMU 60 ends the failure determination processing.

Next, the operational effects of the battery pack 100 and the power supply system 200 according to the present embodiment will be described. As described above, the power supply bus bar 71 is solder-connected at the first power supply connection terminal 71*a* to the first current conduction path where the first switch 31 is provided. Further, the power supply bus bar 71 is solder-connected at the second power supply connection terminal 71*b* to the second current conduction path where the bypass relay 41 and the bypass fuse 42 are provided. Therefore, unlike a configuration in which one connection terminal of the power supply bus bar is solder-connected to the board, even when a failure occurs in one of the first power supply connection terminal 71a and the second power supply connection terminal 71b, it is possible to electrically connect the lead storage battery 110 to the battery pack 100.

Further, the load bus bar 72 is solder-connected at the first load connection terminal 72a to the first current conduction path. The load bus bar 72 is solder-connected at the second load connection terminal 72b to the second current conduction path. Therefore, unlike a configuration in which one connection terminal of the load bus bar is solder-connected to the board, even when a failure occurs in one of the first load connection terminal 72a and the second load connection terminal 72b, it is possible to electrically connect the electrical load 150 to the battery pack 100.

Thus, even when a failure occurs in one of the connection parts between the power supply bus bar 71 and the board 20 and between the load bus bar 72 and the board 20, deterioration in electrical connection reliability between the lead storage battery 110 and the electrical load 150 is suppressed. In other words, even when a failure occurs in one of the first current conduction path and the second current conduction path, deterioration in electrical connection reliability between the lead storage battery 110 and the electrical load 150 is suppressed.

The third power supply connection terminal 71c of the power supply bus bar 71 is connected by screwing to the power supply external terminal 100a, along with the other end of the coupling wire 174. The fourth load connection terminal 72d of the load bus bar 72 is screwed to the load external terminal 100b, along with the sixth connection terminal 183b of the load fuse box 180.

Thereby, the mechanical strength between the power supply bus bar 71 and the coupling wire 174 is higher than the mechanical strength between the power supply bus bar 71 and the board 20. The mechanical strength between the load bus bar 72 and the load fuse box 180 is higher than the mechanical strength between the load bus bar 72 and the board 20.

Therefore, in comparison with the connection part between the power supply bus bar 71 and the board 20 by solder, the occurrence of a failure in the connection part between the power supply bus bar 71 and the coupling wire 174 is suppressed. Further, in comparison with the connection part between the load bus bar 72 and the board 20 by solder, the occurrence of a failure in the connection part between the load bus bar 72 and the load fuse box 180 is suppressed.

Therefore, in spite of the single connection part between the power supply bus bar 71 and the coupling wire 174 and the single connection part between the load bus bar 72 and the load fuse box 180, deterioration in electrical connection reliability between the lead storage battery 110 and the electrical load 150 is suppressed.

First Modification

Figure 8:
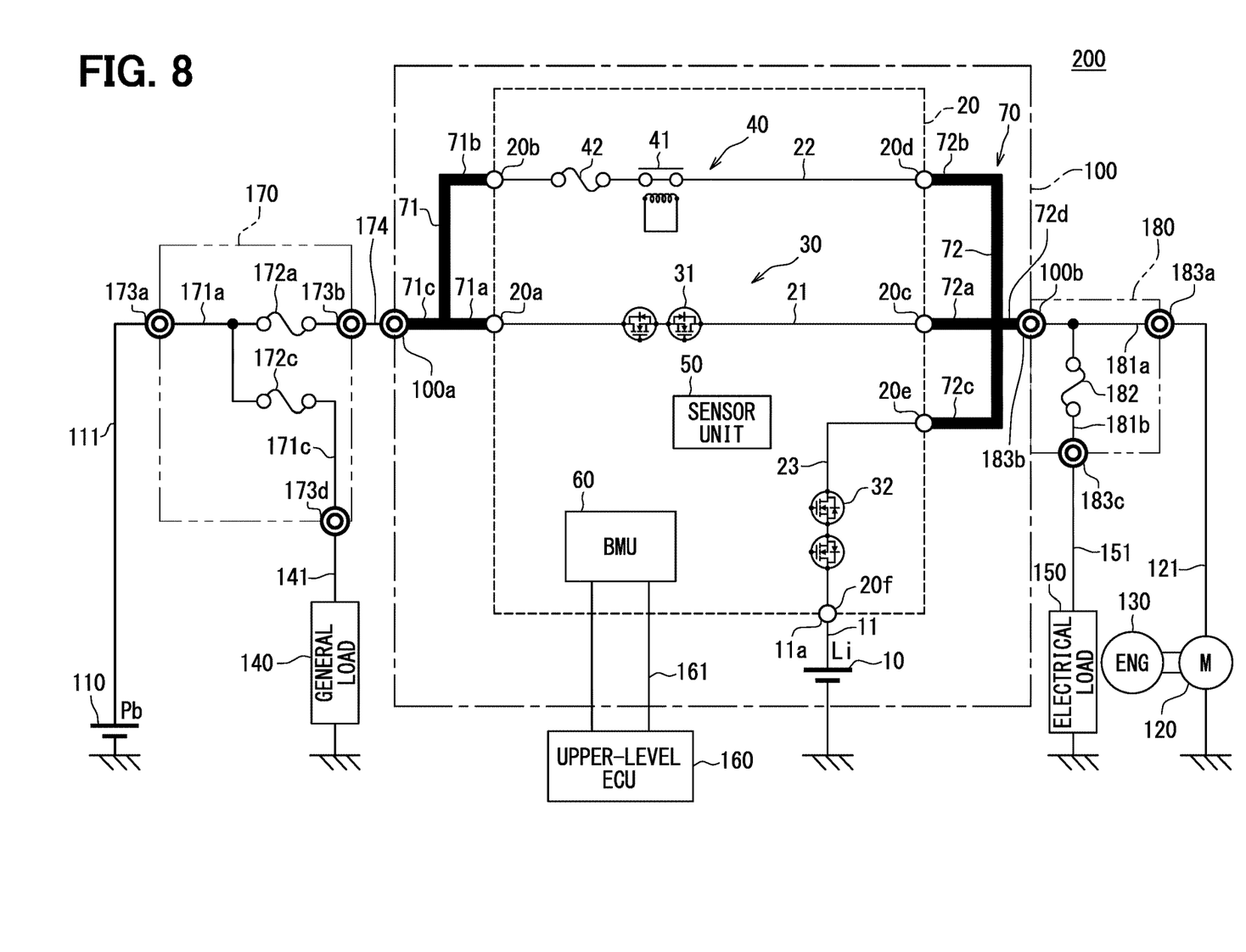
FIG. 8 is a block diagram showing a modification of the power supply system.

The first embodiment shows the configuration in which the rotary electric machine 120 is connected to the power supply fuse box 170. However, as a first modification, it is also possible to adopt a configuration in which the rotary electric machine 120 is connected to the load fuse box 180 as shown in FIG. 8. In this modification, the electrical load 150 and the rotary electric machine 120 correspond to electrical loads.

In the first modification shown in FIG. 8, the power supply fuse box 170 has the first bus bar 171a and the third bus bar 171c as the bus bars. The power supply fuse box 170 has the first fuse 172a and the third fuse 172c as the fuses. The power supply fuse box 170 has the first connection terminal 173a, the second connection terminal 173b, and the fourth connection terminal 173d as the connection terminals. Unlike the embodiment, the other end of the third bus bar 171c is coupled between the first connection terminal 173a and the first fuse 172a of the first bus bar 171a.

The load fuse box 180 has a fourth bus bar 181a and a fifth bus bar 181b as the bus bars. The load fuse box 180 has the fourth fuse 182 as the fuse. The load fuse box 180 has the fifth connection terminal 183a, the sixth connection terminal 183b, and a seventh connection terminal 183c as the connection terminals.

The fifth connection terminal 183a is provided at one end of the fourth bus bar 181a. The sixth connection terminal 183b is provided at the other end of the fourth bus bar 181a. The end of the electric machine wire 121 is screwed to the fifth connection terminal 183a. The sixth connection terminal 183b is screwed to the load external terminal 100b of the battery pack 100. The rotary electric machine 120 is thereby electrically connected to the battery pack 100.

The seventh connection terminal 183c is provided at one end of the fifth bus bar 181b. The other end of the fifth bus bar 181b is connected to the fourth bus bar 181a.

The seventh connection terminal 183c is a connector. The end of the second load wire 151 is fitted to the seventh connection terminal 183c. The electrical load 150 is thereby electrically connected to the battery pack 100.

In this modification as well, the first power supply connection terminal 71a of the power supply bus bar 71 is solder-connected to the first current conduction path of the board 20. The second power supply connection terminal 71b of the power supply bus bar 71 is solder-connected to the second current conduction path of the board 20. Further, the first load connection terminal 72a of the load bus bar 72 is solder-connected to the first current conduction path of the board 20. The second load connection terminal 72b of the load bus bar 72 is solder-connected to the second current conduction path of the board 20.

Therefore, even when a failure occurs in one of the connection parts between the power supply bus bar 71 and the board 20 and between the load bus bar 72 and the board 20, deterioration in electrical connection reliability between each of the electrical load 150 and the rotary electric machine 120 and the lead storage battery 110 is suppressed. In other words, even when a failure occurs in one of the first current conduction path and the second current conduction path, deterioration in electrical connection reliability between each of the electrical load 150 and the rotary electric machine 120 and the lead storage battery 110 is suppressed.

Although not shown, it is also possible to adopt a configuration in which the general load 140 is also electrically connected to the load external terminal 100b instead of the power supply external terminal 100a.

Second Modification

The first embodiment shows the example in which the lead storage battery 110 is connected to the battery pack 100 and the battery pack 100 has the lithium storage battery 10. However, the inclusion relation of the lead storage battery 110 and the lithium storage battery 10 to the battery pack 100 is not limited to the above example. It is possible to adopt a configuration in which the battery pack 100 has at least one of the lead storage battery 110 and the lithium storage battery 10. Alternatively, it is also possible to adopt a configuration in which the battery pack 100 has neither the lead storage battery 110 nor the lithium storage battery 10. In this case, the lead storage battery 110 and the lithium storage battery 10 are each electrically connected to the battery pack 100.

Third Modification

The example of the first embodiment shows the single connection end 11a and the single third power supply terminal 20f of the internal terminal 11. However, a plurality of connection ends 11a and a plurality of third power supply terminals 20f may be employed. In this modification, the battery pack 100 also has a plurality of third feeder lines 23, a plurality of second switches 32, a plurality of third load terminals 20e, and a plurality of third load connection terminals 72c. The second switches 32 are provided in the third feeder lines 23 respectively, and the plurality of third load terminals 20e are solder-connected to the plurality of third load connection terminals 72c. Thereby, even when a failure occurs in one of a plurality of connection parts between the connection ends 11a and the third power supply terminals 20f and a plurality of connection parts between the third load terminals 20e and the third load connection terminals 72c, deterioration in electrical connection reliability between the electrical load 150 and the lithium storage battery 10 is suppressed. In this modification, the lithium storage battery 10 corresponds to a power supply. The internal terminal 11 corresponds to a power supply conduction member. The connection end 11a corresponds to a power supply connection terminal.

Fourth Modification

The first embodiment shows the example in which the power supply system 200 has the power supply fuse box 170 and the load fuse box 180. However, the power supply system 200 is not required to have the power supply fuse box 170 and the load fuse box 180. In this case, corresponding wire harnesses are connected to the power supply external terminal 100a and the load external terminal 100b, respectively.

The first embodiment shows the example in which the power supply fuse box 170 has the first bus bar 171a, the second bus bar 171b, and the third bus bar 171c as the bus bars. However, the number of bus bars that the power supply fuse box 170 has is not limited to the above example. Similarly, the respective numbers of fuses and connection terminals are not limited to the above example.

There is shown the example in which the load fuse box 180 has the fourth bus bar 181a. However, the number of bus bars that the load fuse box 180 has is not limited to the above example. Similarly, the respective numbers of fuses and connection terminals are not limited to the above example.

Fifth Modification

The first embodiment shows the example in which the power supply bus bar 71 has the first power supply connection terminal 71a, the second power supply connection terminal 71b, and the third power supply connection terminal 71c. However, when the number of electrical connection parts between the power supply bus bar 71 and the board 20 is plural, the number of power supply connection terminals that the power supply bus bar 71 has is not limited to the above example.

The first embodiment shows the example in which the load bus bar 72 has the first load connection terminal 72a, the second load connection terminal 72b, the third load connection terminal 72c, and the fourth load connection terminal 72d. However, when the number of electrical connection parts between the load bus bar 72 and the board 20 is plural, the number of load connection terminals that the load bus bar 72 has is not limited to the above example.

Sixth Modification

The first embodiment shows the example in which the vehicle having the power supply system 200 mounted thereon has the idle stop function. However, the vehicle having the power supply system 200 mounted thereon is not limited to the above example.

Seventh Modification

There is shown the example in which the sensor unit 50 has the temperature sensor, the current sensor, and the voltage sensor. However, the sensor unit 50 can have at least one of these sensors. Further, the sensor unit 50 may have another sensor.

For example, the sensor unit 50 may have a submergence sensor for detecting the submergence of the battery pack 100. The submergence sensor has a capacitor composed of counter electrodes. When there is water between the counter electrodes, the dielectric constant (capacitance) of the capacitor changes. The BMU 60 detects the submergence of the battery pack 100, based on whether or not the change in the capacitance of the submergence sensor continues for a predetermined time. The submergence sensor is provided on the bottom side of the enclosure below the board 20.

Figure 2:
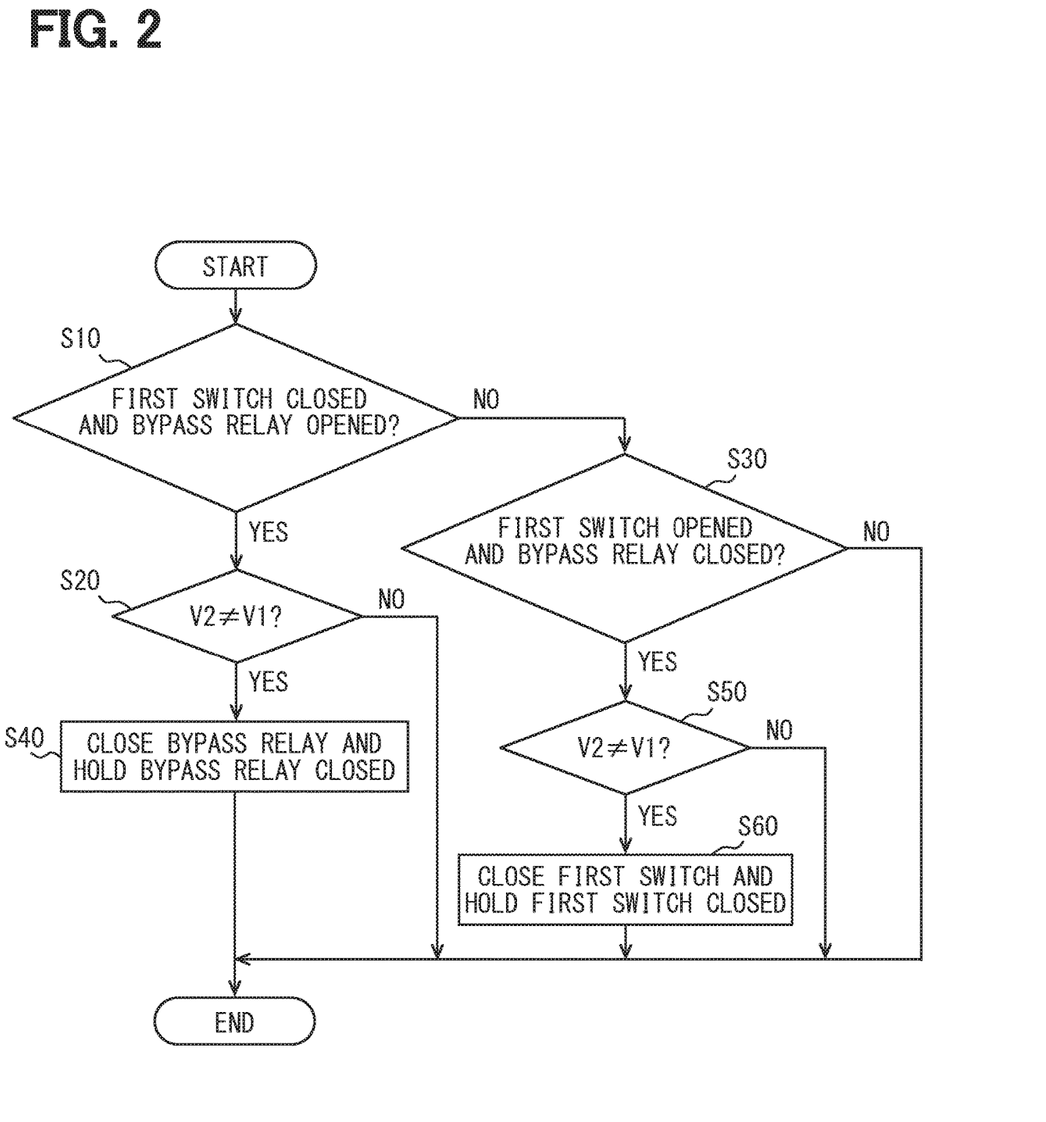
FIG. 2 is a flowchart showing failure determination processing of a current conduction path based on voltage.

In the case where the sensor unit 50 has the voltage sensor without having the current sensor, the BMU 60 performs the failure determination processing shown in FIG. 2. The failure determination of the current conduction path is thereby performed.

Figure 7:
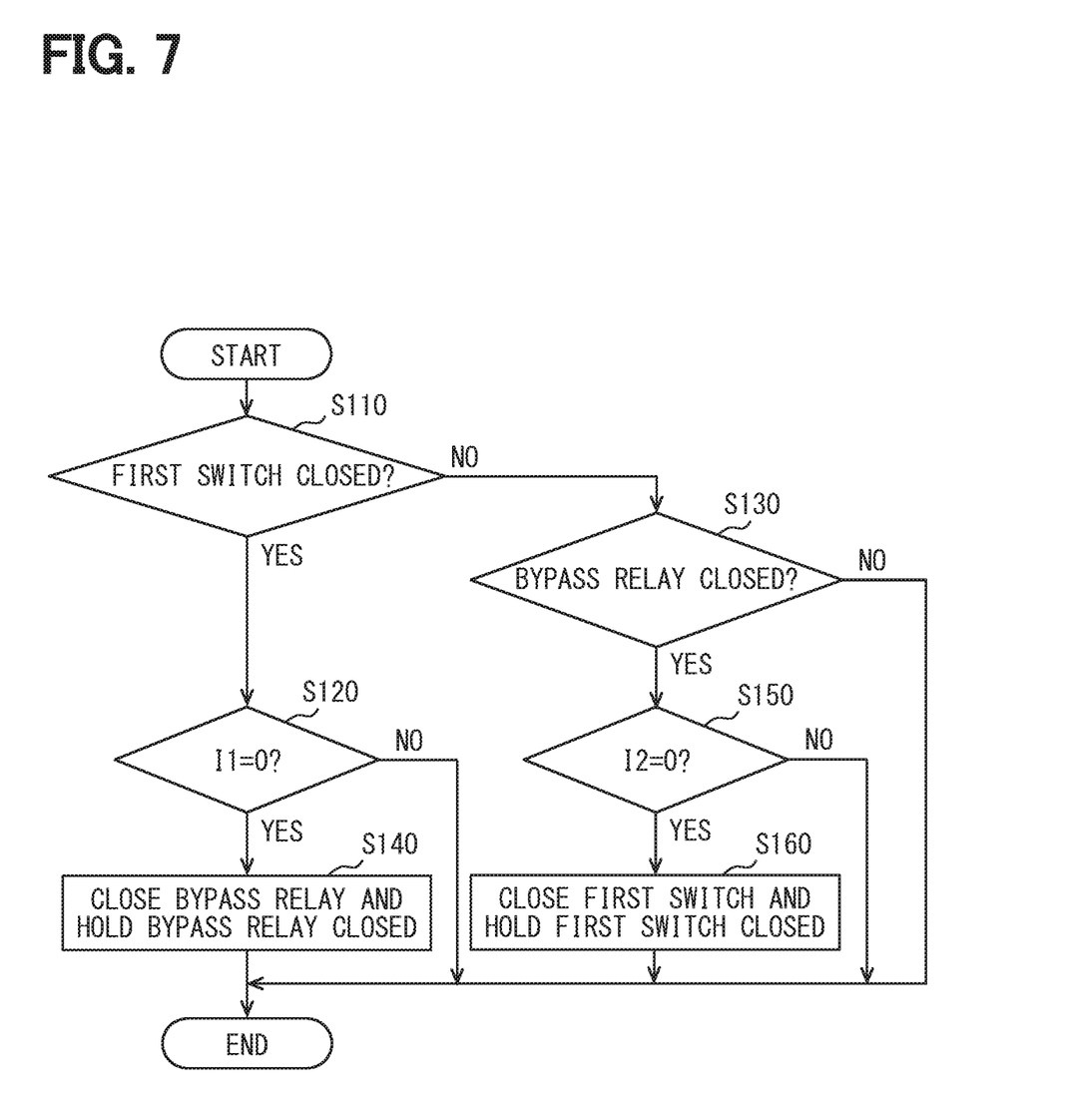
FIG. 7 is a flowchart showing failure determination processing of a current conduction path based on current.

On the other hand, in the case where the sensor unit 50 has the current sensor without having the voltage sensor, the BMU 60 performs the failure determination processing shown in FIG. 7. The failure determination of the current conduction path is thereby performed.

Eighth Modification

The first embodiment shows the example in which the switch 30 is a semiconductor switch. However, when the speed of switching of a switch state from close to open and from open to close can respond to the switching of a vehicle state such as switching from stop to engine drive, the switch 30 may be, e.g., a mechanical relay.

The first embodiment shows the example in which the switch 30 is a MOSFET. However, when the switch 30 is configured of a semiconductor switch, the switch 30 is not limited to the above example. For example, it is also possible to adopt an IGBT as the switch 30.

The first embodiment shows the example in which the switch 30 is an N-channel type MOSFET. However, it is also possible to adopt a P-channel type MOSFET as the switch 30.

The first embodiment shows the example in which the switch 30 has at least one opening/closing unit composed of two MOSFETs connected in series. However, the switch 30 is not limited to the above example. For example, the switch 30 may have one MOSFET. Alternatively, the switch 30 may have a plurality of MOSFETs connected in parallel.

The first embodiment shows the example in which the source electrodes of the two MOSFETs in the opening/closing unit are coupled to each other. However, the drain electrodes of the two MOSFETs in the opening/closing unit may be coupled to each other.

The first embodiment shows the example in which the gate electrodes of the two MOSFETs of the opening/closing unit are electronically independent of each other. However, it is also possible to adopt a configuration in which the gate electrodes of the two MOSFETs are at the same potential.

The first embodiment shows the example in which the anode electrodes of the parasitic diodes of the two MOSFETs of the opening/closing unit are coupled to each other. However, it is also possible to adopt a configuration in which the cathode electrodes of the parasitic diodes are coupled to each other. In the case where the IGBT is adopted as the switch 30, diodes are connected in parallel to two IGBTs of the opening/closing unit. In this case, the cathode or anode electrodes of the two diodes are connected to each other.

The first embodiment shows the example in which the first switch 31 and the second switch 32 each have a plurality of opening/closing units. However, it is also possible to adopt a configuration in which at least one of the first switch 31 and the second switch 32 has one opening/closing unit.

The first embodiment shows the example in which the respective source electrodes of a plurality of opening/closing units connected in parallel are electrically connected to each other. However, the respective source electrodes of the opening/closing units are not required to be electrically connected to each other. The source electrodes of some of the opening/closing units may be electrically connected to each other.

The first embodiment shows the example in which the bypass relay 41 is a mechanical relay. However, the bypass relay 41 is not limited to the above example. It is also possible to adopt a semiconductor switch as the bypass relay 41.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A battery pack comprising:
   a circuit board;
   a power supply conduction member that (1) is separate from the circuit board and (2) includes a power supply conduction member end that is configured to be electrically connected to a power supply, a first power supply connection terminal extending from the power supply conduction member end and a second power supply connection terminal extending from the power supply conduction member end separately from the first power supply connection terminal;
   a first power supply terminal and a second power supply terminal that are formed on the circuit board, the first power supply terminal being mechanically and electrically connected to the first power supply connection terminal of the power supply conduction member, the second power supply terminal being mechanically and electrically connected to the second power supply connection terminal of the power supply conduction member;
   a load conduction member that (1) is separate from the circuit board and (2) includes a load conduction member end that is configured to be electrically connected to an electrical load, a first load connection terminal extending from the load conduction member end and a second load connection terminal extending from the load conduction member end separately from the first load connection terminal;
   a first load terminal and a second load terminal that are formed on the circuit board, the first load terminal being mechanically and electrically connected to the first load connection terminal of the load conduction member, the second load terminal being mechanically and electrically connected to the second load connection terminal of the load conduction member;
   a first wiring pattern that is formed on the circuit board and connects the first power supply terminal and the first load terminal;
   a second wiring pattern that is formed on the circuit board and connects the second power supply terminal and the second load terminal;
   a first switch in the first wiring pattern;
   a second switch in the second wiring pattern, wherein
   the first power supply terminal, the first load terminal, the first wiring pattern and the first switch comprise a first current conduction path on the circuit board that is separate from and electrically parallel to a second current conduction path on the circuit board comprised of the second power supply terminal, the second load terminal, the second wiring pattern and the second switch.

2. The battery pack according to claim 1, wherein:
   the first power supply terminal and the first power supply connection terminal are soldered together and the second power supply terminal and the second power supply connection terminal are soldered together, and
   the first load terminal and the first load connection terminal are soldered together and the second load terminal and the second load connection terminal are soldered together.

3. The battery pack according to claim 2, wherein
   the power supply conduction member is configured to be electrically connected to the power supply through a power supply wiring line,
   the load conduction member is configured to be electrically connected to the electrical load through a load wiring line,
   the power supply conduction member and the power supply wiring line are mechanically and electrically connected by at least one of screwing and fusion welding, such that a mechanical strength between the power supply conduction member and the power supply wiring line is higher than a mechanical strength of soldering between the first and second power supply terminals and the first and second power supply connection terminals, and
   the load conduction member and the load wiring line are mechanically and electrically connected by at least one of screwing and fusion welding, such that a mechanical strength between the load conduction member and the load wiring line is higher than a mechanical strength of soldering between the first and second load terminals and the first and second load connection terminals.

4. The battery pack according to claim 1, further comprising:
an opening/closing control unit that is configured to perform opening/closing control of the first and second switches, and
a failure detection unit that is configured to detect a failure in the first current conduction path between the first power supply terminal and the first load terminal and in the second current conduction path between the second power supply terminal and the second load terminal, wherein when at least one of the first and second switches is controlled to a closed state by the opening/closing control unit, the failure detection unit detects a current flowing through a current conduction path of the first and second current conduction paths that includes the at least one of the first and second switches in the closed state, and thereby detects a failure in the current conduction path of the first and second current conduction paths that includes the at least one of the first and second switches in the closed state.

5. The battery pack according to claim 1, comprising:
an opening/closing control unit that is configured to perform opening/closing control of the first and second switches, and
a failure detection unit that is configured to detect a failure in the first current conduction path between the first power supply terminal and the first load terminal and in the second current conduction path between the second power supply terminal and the second load terminal, wherein when at least one of the first and second switches is controlled to a closed state and the other of the first and second switches is controlled to an opened state by the opening/closing control unit, the failure detection unit detects voltages of the first and second switches, and thereby detects a failure in one of the first and second current conduction paths.

6. The battery pack according to claim 1, wherein
the first current conduction path including the first wiring pattern and the first switch is higher in withstand current than the second current conduction path including the second wiring pattern and the second switch.

7. A power supply system comprising:
a power supply;
a circuit board;
a power supply conduction member that (1) is separate from the circuit board and (2) includes a power supply conduction member end that is electrically connected to the power supply, a first power supply connection terminal extending from the power supply conduction member end and a second power supply connection terminal extending from the power supply conduction member end separately from the first power supply connection terminal;
a first power supply terminal and a second power supply terminal that are formed on the circuit board and are mechanically and electrically connected to the first and second power supply connection terminals of the power supply conduction member;
an electrical load;
a load conduction member that (1) is separate from the circuit board and (2) includes a load conduction member end that is electrically connected to the electrical load, a first load connection terminal extending from the load conduction member end and a second load connection terminal extending from the load conduction member end separately from the first load connection terminal;
a first load terminal and a second load terminal that are formed on the circuit board, and are mechanically and electrically connected to the first and second load connection terminals of the load conduction member;
a first wiring pattern that is formed on the circuit board and connects the first power supply terminal and the first load terminal;
a second wiring pattern that is formed on the circuit board and connects the second power supply terminal and the second load terminal,
a first switch in the first wiring pattern; and
a second switch in the second wiring pattern; wherein
the first power supply terminal, the first load terminal, the first wiring pattern and the first switch comprise a first current conduction path that is separate from and electrically parallel to a second current conduction path comprised of the second power supply terminal, the second load terminal, the second wiring pattern and the second switch.

8. The battery pack according to claim 1, wherein
each of the power supply conduction member and the load conduction member is a bus bar made of an electrically conductive material.

9. A battery pack comprising:
a power supply conduction member that is configured to be electrically connected to a power supply;
a plurality of power supply terminals that are formed on a circuit board and mechanically and electrically connected to the power supply conduction member;
a load conduction member that is to be electrically connected to an electrical load;
a plurality of load terminals that are formed on the circuit board and mechanically and electrically connected to the load conduction member;
a plurality of wiring patterns that are formed on the circuit board and connect the plurality of power supply terminals and the plurality of load terminals;
a plurality of switches that are provided in the plurality of wiring patterns;
an opening/closing control unit that is configured to perform opening/closing control of the plurality of switches; and
a failure detection unit that is configured to detect a failure in current conduction paths between the plurality of power supply terminals and the plurality of load terminals, wherein
the power supply conduction member includes a plurality of power supply connection terminals that are separate from the circuit board and mechanically and electrically connected to the plurality of power supply terminals to form a plurality of power supply connection parts,
the load conduction member includes a plurality of load connection terminals that are separate from the circuit board and mechanically and electrically connected to the plurality of load terminals to form a plurality of load connection parts, and
when at least one of the plurality of switches is controlled to a closed state and remaining switches of the plurality of switches are controlled to an opened state by the opening/closing control unit, the failure detection unit detects voltages of the plurality of switches, and thereby detects a connection failure of any of the connection parts in the current conduction paths.

10. The battery pack according to claim 1, wherein:
each of the power supply conduction member and the load conduction member is a single bus bar;

the first power supply connection terminal is connected to the first power supply terminal by soldering on the circuit board to form a first power supply connection on the circuit board;

the second power supply connection terminal is connected to the second power supply terminal by soldering on the circuit board to form a second power supply connection on the circuit board;

the first load connection terminal is connected to the first load terminal on the circuit board by soldering to form a first load connection on the circuit board; and the second load connection terminal is connected to the second load terminal on the circuit board by soldering to form a second load connection on the circuit board.

* * * * *